Jan. 20, 1970          C. E. SEITZ          3,490,359
ELECTRIC CHARBROILER
Filed Sept. 20, 1967          3 Sheets-Sheet 1
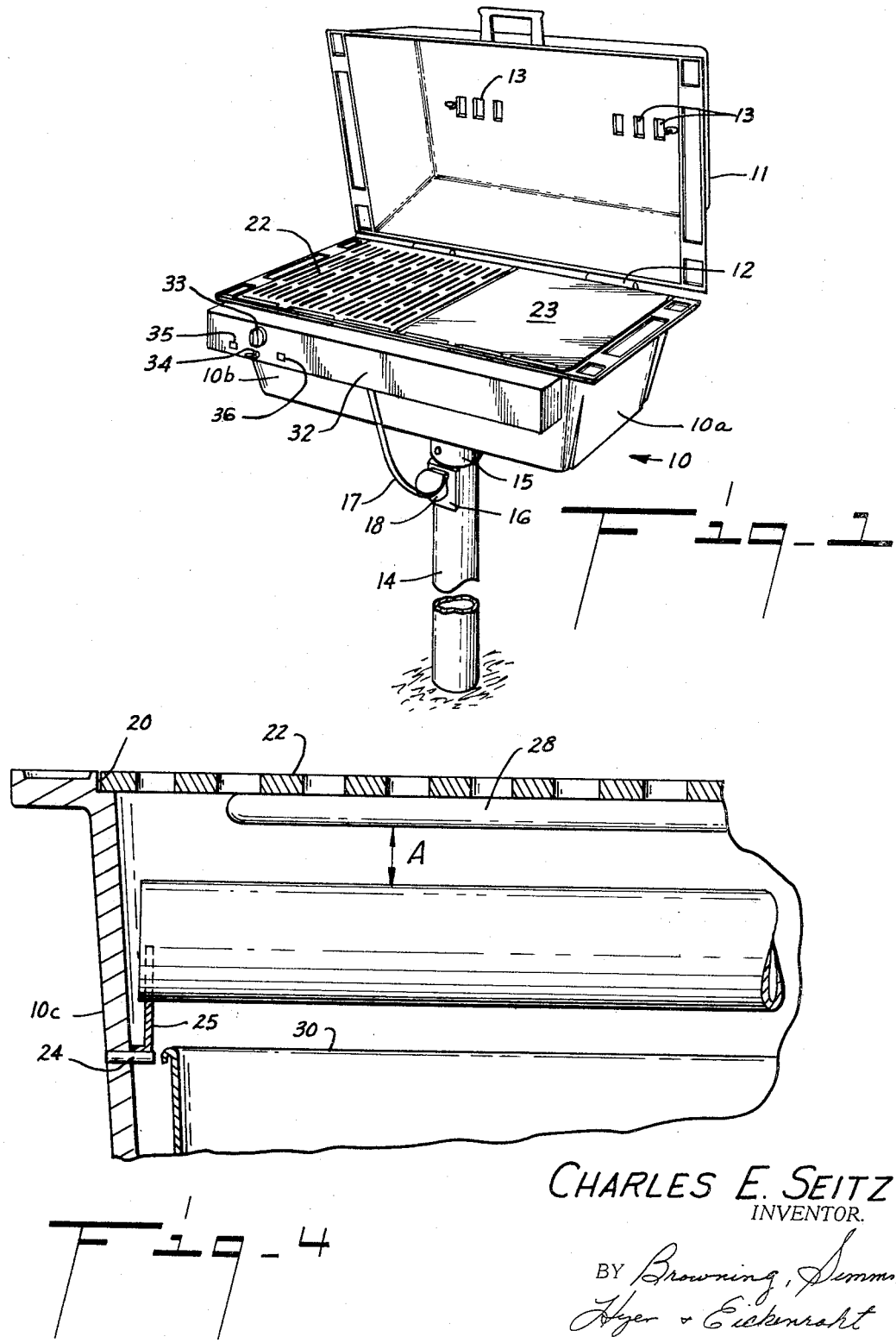
CHARLES E. SEITZ
INVENTOR.
BY Browning, Simms,
Hyer & Eickenroht
ATTORNEYS

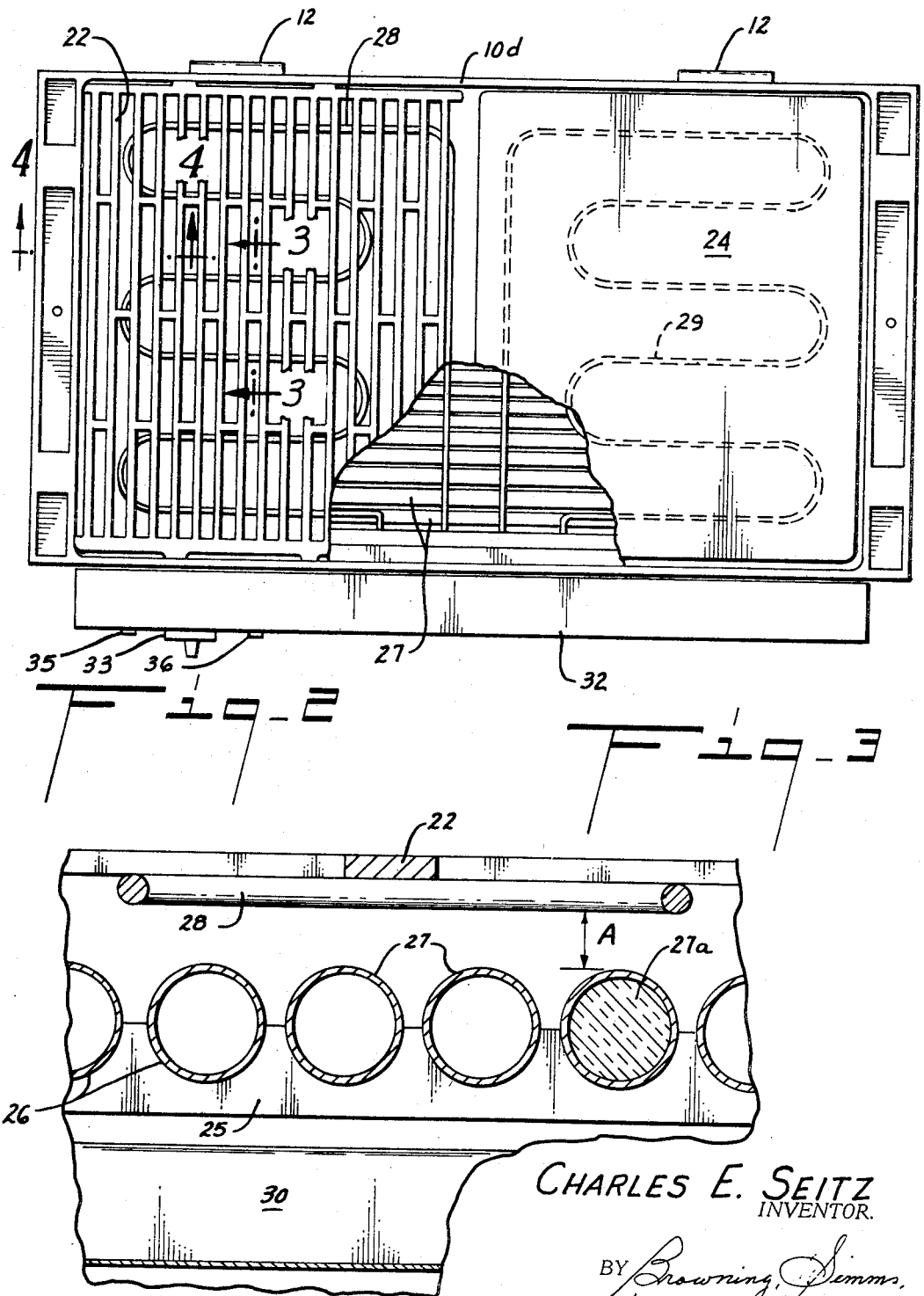

Jan. 20, 1970     C. E. SEITZ     3,490,359
ELECTRIC CHARBROILER
Filed Sept. 20, 1967     3 Sheets-Sheet 3
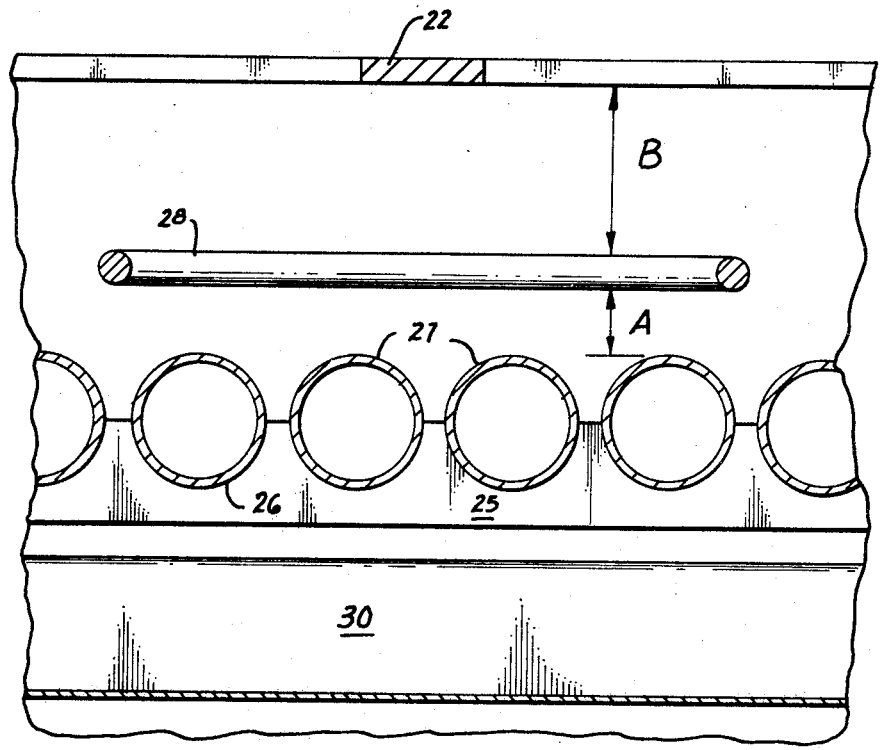
CHARLES E. SEITZ
INVENTOR.

United States Patent Office 3,490,359
Patented Jan. 20, 1970

3,490,359
ELECTRIC CHARBROILER
Charles E. Seitz, 6063 Forrest Lane, Dallas, Tex. 75234
Filed Sept. 20, 1967, Ser. No. 669,203
Int. Cl. A47j *37/07, 27/00;* H05b *3/40*
U.S. Cl. 99—400                                         4 Claims

ABSTRACT OF THE DISCLOSURE

An electric charbroiler is disclosed for efficient operation on conventional household circuits of 110–125 volts and having amperage ratings conventional in such circuits. The charbroiler includes an infrared radiating heating element which is positioned below a grate for supporting the meat which is to be charbroiled. A plurality of spaced horizontal reflector tubes are spaced below the heating element a distance sufficient that the heating elements heats the tubes to a temperature such as to vaporize fat drippings that fall on the tubes to produce smoke for flavoring the meat but not high enough to cause continuous flaming of the drippings. The heating element is spaced below the grate a distance such that when the element is operating continuously at its rated wattage, meat on the grate will be charbroiled to the desired appearance and flavor of charcoal broiled meat. The heating element is also disposed so as to expose a maximum area of the element to the meat on the grate so that the meat is charbroiled primarily by radiant heat and desired sear marking is accomplished by the grate. The charbroiler also includes a means for connecting the heating element to a 110–125 volt A.C. source to cause the element to maintain a glowing red color continuously during the charbroiling of the meat.

---

This invention relates to electric broilers for operation on 110–125 volts A.C. current.

Meat broiled over a bed of burning charcoal has a distinctive flavor and appearance. This is achieved because the radiant heat from the charcoal heats the meat to the proper temperature and because the drippings from the meat are burned by the charcoal, producing an atmosphere of smoke and vaporized fats to flavor the meat. Both electric and gas broilers have been designed to produce meat having the appearance and flavor of charcoal broiled meat. These broilers are termed "charbroilers." Electric charbroilers in the past have primarily operated from 220 volt sources with high wattage heating elements, frequently of the order of 6,000 watts. These charbroilers, such as the one shown in the Beasley Patent 3,301,170, have had several disadvantages. First, their cost has been too high to permit any substantial use in the ordinary household and accordingly, their prime use has been in the commercial market. Second, their high wattage heating elements excessively heated any reflector tubes placed below the heating elements with the result that fat drippings upon these tubes flamed up and in many cases caused a continuous fire below and above the grate. Another disadvantage of these high wattage, high voltage units is that they had to use thermostats in order to keep the heating element within an acceptable charbroiling temperature range. These thermostats would turn the heating elements intermittently off and on so that the latter ranged in color from a glowing red to a dull gray. As a result, the heating elements did not operate continuously at their rated wattage and hence were inefficient. Also, the temperature would tend to fluctuate thereby increasing charbroiling time. Moreover, many of these elements were located directly below the grate, and some even attached thereto, so that the grate tended to or did screen the meat from exposure to any infrared energy emanating from the heating element.

Another and perhaps even more serious disadvantage of the 220 volt units, at least insofar as the home market is concerned, is that they require a 220 volt circuit. Normally such circuits are not available in areas where charbroiling is apt to occur such as on patios, etc. Therefore special circuits would have to be wired in and these are expensive. It therefore would be desirable to have a charbroiler which could operate from conventional household circuits rated at 110–125 volts and 15 amps and yet produce and conserve enough heat to achieve the desired appearance and flavor of charcoal broiled meat and, it is an object of this invention to provide such a charbroiler.

Another object is to provide a charbroiler whose heating element operates substantially continuous at its full rated voltage and wattage while charbroiling so as to eliminate the need for thermostats or other limit control devices thereby considerably increasing the efficiency of the heating element and charbroiling operation.

Another object is to provide such a charbroiler in which the heating element is operating at its rated wattage during the entire charbroiling operation thereby giving a continuous emanation of infrared energy which not only passes directly to the meat but substantial portions of it are reflected indirectly from reflective surfaces below the heating element and meat whereby the efficiency of the charbroiler is considerably increased.

Another object is to provide a charbroiler in which the reflector members are arranged with respect to the heating element so as to vaporize fat drippings sufficiently without any continuous flame up due to the fat drippings thereby avoiding fire while at the same time giving the desired smoke for a charbroiling operation and to do this without the use of any limit control and while operating the heating element under its full voltage and wattage capacity.

These and other objects, advantages and features of this invention will be apparent to those skilled in the art from a consideration of this specification, claims and attached drawings wherein:

FIG. 1 is an isometric view of an electric charbroiler and griddle combination mounted on a post for outside cooking;

FIG. 2 is a plan view of the cooking surface of the charbroiler and griddle with a portion of the charbroiler grate and the griddle broken away to show the heating element and reflector tubes located below them;

FIG. 3 is a sectional view taken along line 3—3 of FIG. 2;

FIG. 4 is a sectional view taken along line 4—4 of FIG. 2; and

FIG. 5 illustrates another embodiment of the invention and is a view similar to FIG. 3.

The combination charbroiler and griddle in the drawings will hereinafter be referred to simply as a charbroiler. The housing 10 includes a cover or lid 11. The lid is mounted on the lower part of the housing 10 by hinges 12 so that it can be opened and closed. Lid 11 is provided with openings 13, the width of which can be adjusted in the conventional manner to control the draft through the housing.

The charbroiler is shown mounted on post 14 for outside cooking. It is held on the post by collar 15, which is attached to the bottom of housing 10 and which slides over the upper end of post 14. Electrical power is connected upwardly through the post to outlet receptacle 16. Flexible electric cable 17 with plug 18 connects control box 32 of the charbroiler to the electrical power supplied through receptacle 16. With this arrangement, the charbroiler can be unplugged, removed from the post 14, and placed on a wheeled cart for movement to other places for cooking when desired.

Housing 10 is shaped like a deep rectangular pan having a bottom (not shown) and four upwardly extending side walls 10a–10d. The upper edge of the walls is provided with notch 20 to support both grate 22 and griddle 23, as shown in FIG. 4. Also as shown in FIG. 4, reflector tube mounting plate 25 is supported by pins 24 extending through the side wall 10c of the housing. End wall 10a is similarly provided with pins to support a reflector tube mounting plate at the opposite side of the housing. Each mounting plate is provided with a plurality of equally spaced semi-circular grooves 26, as shown in FIG. 3. Each groove in plate 25 is in alignment with a similar groove in the supporting plate at the other end of the housing. Each aligned pair of grooves supports one reflector member, here shown as tube 27 and thus the tubes are in spaced parallel positions below the grate and the griddle.

Reflector members 27 are hollow and, preferably, have a highly polished outer surface and in any event, are made from a material capable of reflecting substantial quantities of radiant energy including infrared. It is one purpose of these tubes to reflect back to the grate infrared energy that travels downwardly from heating element 28 below the grate. By reflecting this energy, while at the same time placing the reflector tubes so that they will be heated sufficiently to generate smoke from fat drippings without causing the latter to flame continuously, as explained below, it is possible to use a heating element rated within the range of conventional household circuit, i.e., 110 to 125 volts A.C. and wattages of the order of 1500 to 2000 and yet obtain sufficient watt and heat density to charbroil meats to the desired appearance and flavor of charcoal broiled meat. As a result, this charbroiler can be plugged into conventional, existing household circuits without special wiring or fusing.

As indicated above, the reflector tubes should be located a distance below the heating element such that they will be heated to a temperature sufficiently high to vaporize some of the fat drippings that fall on them to produce smoke for flavoring the meat but not high enough to cause continuous flaming of the drippings. The reflector tubes then serve to increase the radiant heat received by meat from the heating element, to provide the smoke for the cooking atmosphere that gives the meat the characteristic charcoal broiled flavor and to insulate the grease pan 30 from excessive heat.

The reflector tubes are located no more than one inch below heating element 28. This distance is designated by the dimension A in FIGS. 3, 4 and 5. The optimum distance from the reflector tubes to the heating element has been found to be from ¼ to ½ inch. With the reflector tubes spaced within the range of ¼ to 1 inch from a 110–125 volt heating element, the temperature at the grate and between the grate bars is less than that previously thought to be required to simulate charcoal broiling and it varies with the distance the reflector tubes are below the heating element. In this connection, it should be pointed out that heating element 28 is operated during the charbroiling operation continuously at a maximum capacity and at its rated wattage to provide a continuous and uniform quantity of infrared heat to the meat, both directly and indirectly, without the danger of burning the meat or setting the drippings continuously on fire. By supplying the heat to the meat at a uniform rate, better control of the degree of doneness of the meat is obtained. Thus, the power to the heating element is continuous and at a uniform rate and not intermittent as in the case of a thermostatically controlled heating element. As a result, the efficiency at which the heating element operates is at its design maximum and the element operates continuously at a glowing red color. Compared with a 6000 watt, 220 volt element operated thermostatically to charbroil, a 1500 watt, 110 volt element arranged in the combination of this invention will consume less than 25% of the power consumed by the 6000 watt element. Also, when cooking a full capacity of meat, the instant charbroiler will cook about twice as fast.

In service, of course, the reflector tubes below the grill will become covered with soot and their outer surfaces will be blackened. Nevertheless they will continue to reflect the infrared heat from the heating element sufficiently for the purpose described above.

The reflector tubes also serve to prevent the drippings that are collected in grease pan 30 located in the bottom of housing 10 from overheating and starting to burn, which would create a first hazard. Preferably, the tubes are hollow. They may be filled with insulation 27a if desired; however, little if any decrease in grease pan temperature has been noted when tubes filled with insulation were used. The tubes are spaced apart to allow some of the drippings to fall through into the grease pan. While they are shown as cylindrical in shape they may be of other configurations, such as triangular, so long as they provide a dead air space, or insulation, between the heating element and the grease pan.

As indicated in FIG. 3, heating element 28 can be positioned directly under and supported by grate 22. In the FIG. 3 position, the spacing between the heating element and the grate is essentially zero. This has been found satisfactory when using heating elements having a wattage rating in the range of 1500 watts or less. However, when heating elements having a wattage rating of the order of 2000 watts are used, the spacing between the heating element and the grate should be increased as indicated by the distance B in FIG. 5. Ordinarily, the sum of the distances A and B plus the diameter of the heating element should ordinarily not exceed 2 inches and the optimum distance B for any given wattage element can be determined by mere routine tests. At any rate, the heating element should be spaced below the grate a distance sufficient such that when the heating element is operating substantially continuously at its rated wattage, meat on the grate will be charbroiled to the desired appearance and flavor of charbroiled meat. Moreover, the heating element, taking into account its configuration and that of the grate, should be disposed so as to expose a maximum area of the heating element to the meat on the grate. This permits a maximum of radiant heat from the heating element to strike the meat.

The spacing between the reflector members depends to some degree on their size. In one commercial embodiment, aluminum tubing one inch in diameter with a wall thickness of .049 mounted on 1⅛ inch centers was used satisfactorily.

Heating element 28, located under grill 22, is shown to be of serpentine configuration although other configurations can be used. It comprises a resistive element in a metal sheath. At any rate, in operation it should emit substantial quantities of infrared energy.

Heating element 29 is of the same configuration as element 28. The heat it produces that strikes griddle 23 directly, plus the heat reflected by the reflector tubes below the griddle, is sufficient to provide sufficient heat to the griddle for all purposes. Actually, for many griddle uses, the heat output of element 29 must be reduced.

The heating elements are connected through the front wall of the housing into control box 32. Elements 28 and 29 may be attached to and supported by the grill or griddle, respectively, or by separate means. Control knob 33 adjusts an infinite heat control to adjust its heat output to control the temperature of the griddle. Toggle switch 34 controls a three-position, double-pole, double-throw switch. When moved to the left it turns on the charbroiler which is indicated by pilot light 35 and when moved to the right it turns on the griddle, which is indicated by pilot light 36.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An electric charbroiler comprising a housing, a grate supported by one of the housing and the later mentioned heating element for supporting meat, an elongated electrically resistive heating element disposed below the grate and being generally coextensive therewith to supply heat over substantially the entire surface of the grate and having a voltage rating in the range of 110 to 125 volts, A.C., said heating element in operation emitting substantial quantities of infrared energy, a plurality of spaced hollow reflector members of a material capable of reflecting substantial quantities of radiant energy and located below the heating element a distance such that the heating element heats the reflector members to a temperature sufficiently high to vaporize fat drippings that fall on the reflector members from the meat being charbroiled to produce smoke for flavoring the meat but not high enough to cause continuous flaming of fat drippings, said heating element being spaced below the grate a distance such that when the heating element is operating substantially continuously at its rated wattage, meat on said grate will be charbroiled to the desired appearance and flavor of charcoal broiled meat, said heating element being disposed relative to the grate so as to expose a maximum area of the heating element to meat on the grate whereby meat on the grate is charbroiled primarily by radiant heat from the heating element and from the reflector members and desired sear marking is accomplished by the grate, and means for connecting the heating element to a 110–125 volt A.C. source to cause said heating element to maintain a glowing red color substantially continuously during charbroiling of meat.

2. The electric charbroiler of claim 1 in which the reflector members are from ¼ to ½ inch from the heating element and the grate is in contact with the heating element.

3. The electric charbroiler of claim 1 wherein the grate is spaced above and out of contact with the heating element a distance such that with the heating element consuming a relatively high wattage, meat on said grate will achieve said desired appearance and flavor without undesired burning.

4. The electric charbroiler of claim 1 further provided with a grease pan below the reflector members to catch the drippings from the meat that fall below the reflector members and in which the number of reflector members is sufficient to reflect the downwardly directed radiant energy from the heating element sufficiently to keep the temperature in the grease pan below the flash point temperature of the drippings.

References Cited

UNITED STATES PATENTS

| 2,243,993 | 6/1941 | Watson | 99—402 X |
| 2,812,706 | 11/1957 | Francia | 99—446 |
| 3,174,863 | 3/1965 | Shoup | 99—385 X |
| 3,252,407 | 5/1966 | Buerki | 99—446 |
| 3,375,775 | 4/1968 | Folmar | 99—401 |

ROBERT W. JENKINS, Primary Examiner

U.S. Cl. X.R.

99—401, 447